US010356142B1

(12) United States Patent
Rajagopalan et al.

(10) Patent No.: US 10,356,142 B1
(45) Date of Patent: Jul. 16, 2019

(54) MEDIA STREAMING DEVICES WITH NOISE MITIGATION

(71) Applicant: Amazon Technologies, Inc., Seattle, WA (US)

(72) Inventors: Jagan Vaidyanathan Rajagopalan, Fremont, CA (US); Amit Shailesh Gaikwad, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 432 days.

(21) Appl. No.: 15/154,252

(22) Filed: May 13, 2016

(51) Int. Cl.
*H04N 7/16* (2011.01)
*H04L 29/06* (2006.01)
*H04W 84/12* (2009.01)

(52) U.S. Cl.
CPC .......... *H04L 65/4069* (2013.01); *H04L 65/80* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 8,069,465 B1* | 11/2011 | Bartholomay | .......... | H04L 47/14 370/395.4 |
| 2003/0120809 A1* | 6/2003 | Bellur | ..................... | H04L 45/02 709/239 |
| 2007/0071118 A1* | 3/2007 | Sydir | ....................... | H04K 1/00 375/260 |
| 2010/0184386 A1* | 7/2010 | Muterspaugh | ....... | H01Q 21/245 455/73 |
| 2011/0047394 A1* | 2/2011 | Sato | ...................... | G06F 1/3215 713/310 |
| 2011/0080485 A1* | 4/2011 | Kimoto | ................... | H04N 5/232 348/192 |
| 2011/0242415 A1* | 10/2011 | Wakabayashi | ............ | G06F 3/14 348/554 |
| 2012/0044108 A1* | 2/2012 | Frigon | ................... | H01Q 25/00 342/368 |
| 2014/0097987 A1* | 4/2014 | Worl | ...................... | H01Q 1/287 342/377 |
| 2014/0281471 A1* | 9/2014 | Bakar | ..................... | G06F 9/445 713/100 |
| 2014/0368740 A1* | 12/2014 | Roberts | .................. | H04N 5/268 348/705 |

\* cited by examiner

*Primary Examiner* — William J Kim
(74) *Attorney, Agent, or Firm* — Eversheds Sutherland (US) LLP

(57) ABSTRACT

Systems, methods, and computer-readable media are disclosed for streaming media content. The systems, methods, and computer-readable media described herein may improve user experiences and reduce device failures by mitigating problems between devices. In an example method described herein, a media streaming device may be connected to a display device in order to facilitate streaming of content. A processing apparatus of the media streaming device may determine that the display device is not presenting content streamed from the media streaming device and in turn switch the antenna radiation pattern from a first pattern to a second pattern.

19 Claims, 9 Drawing Sheets

MEDIA STREAMING DEVICES WITH NOISE MITIGATION

BACKGROUND

Users may view or watch content on display devices such as televisions. Such content may be provided to the television from a variety of input devices such as streaming devices, cable boxes, gaming consoles and the like. In many cases, such devices may affect the performances of one another or even damage one another when connected to one television.

Naturally, the ability to mitigate such problems can significantly reduce failures associated with such devices and in turn reduce the associated maintenance costs while enhancing the user experience and satisfaction. Accordingly, there exists a dire market need for systems and methods that can mitigate such problems.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
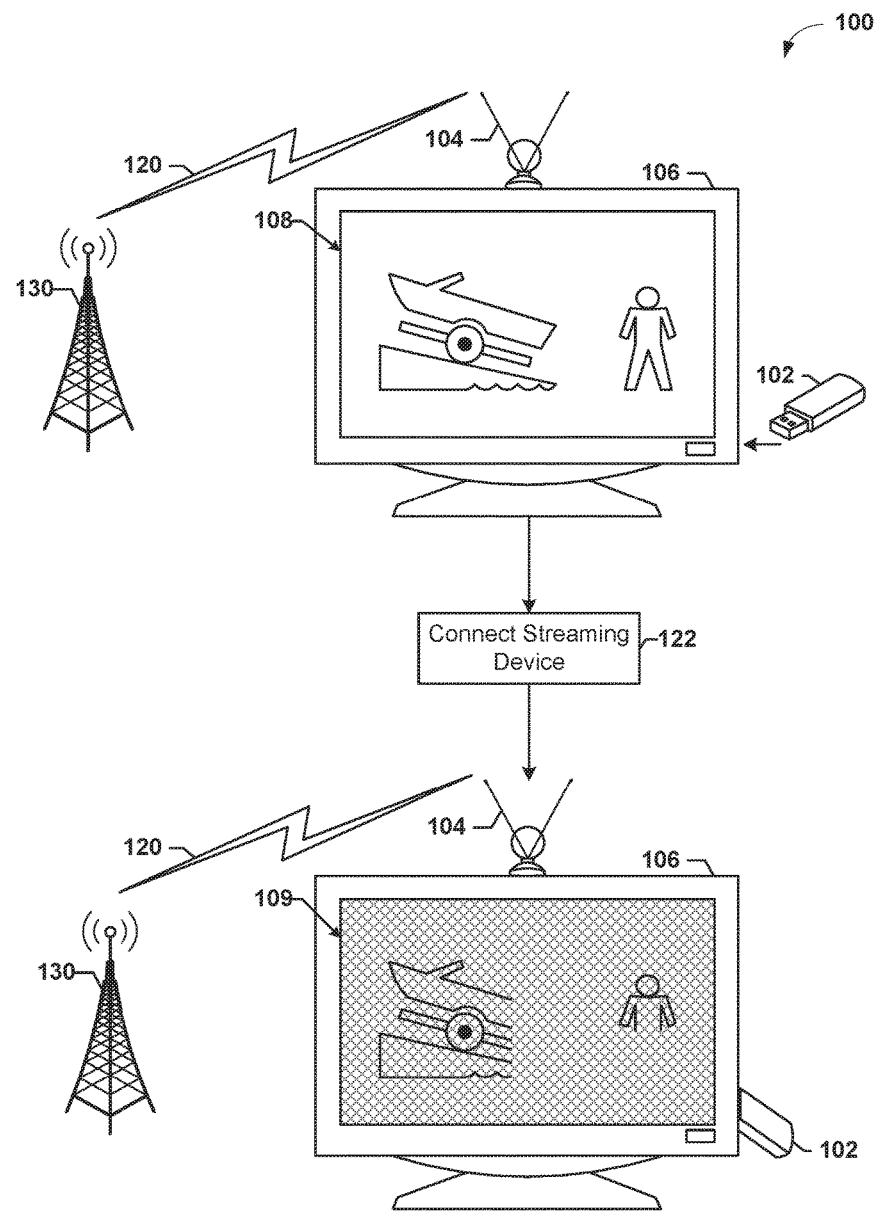
FIGS. 1A-1B illustrate an environment where one or more devices may operate in accordance with one or more example embodiments of the disclosure.

This disclosure relates to, among other things, systems, methods, computer-readable media, techniques, and methodologies mitigating signal interference caused by operation of certain devices, such as media streaming devices, in close proximity to one another and/or a display device such as a television.

Generally, a media streaming device may be a device configured to facilitate streaming of remotely stored content and/or configured for presentation of locally and/or remotely stored content. It should be understood that the term "audiovisual content" as used herein describes audio and/or visual content. Similarly, it should be understood that the term "audiovisual data" as used herein describes data on which audio and/or visual content is encoded.

Display devices such as television may be connected to a plurality of audiovisual content sources simultaneously. For example, a display device may be connected to a media streaming device, a cable and/or set-top box, a television tuner, a DVD player, a gaming console, and/or the like. A user may control the display device to select one of the audiovisual sources connected to the display device. In some examples, the media streaming devices may interfere with the other audiovisual content sources. For example, media streaming devices may interfere with the television tuner. In one example, a media streaming device connected to the display device may block a television tuner connected to the display device and, in turn, prevent viewers from watching broadcast channels. This problem may manifest even if the media streaming device is not actively streaming content (e.g., connected to a television but not being used to stream content).

Embodiments of the disclosure may improve the user experience and reduce device failures by mitigating the interference between such devices (e.g., audiovisual content sources). In one implementation, the media streaming device may disable particular modules or blocks of the media streaming device, when the media streaming device is not actively streaming content in order to reduce the interference described herein. In one implementation, the media streaming device may change a radiation pattern generated by antennas of the media streaming device such that the antenna radiation pattern is directed away from the display device and/or the television tuner, when the media streaming device is not actively streaming content. In turn, these implementations may reduce or eliminate the interference described above.

In an example implementation, media streaming, as described herein, may be facilitated by a user device, such as a laptop or wireless access point, configured to communicate with a media streaming device that is, in turn, configured to provide audiovisual data to a display device (e.g., television, monitor and/or the like) for presentation to the user. The media streaming device may activate the modules deactivated previously, when the user is ready to resume streaming of the audiovisual content. Similarly, the media streaming device may revert the antenna radiation pattern back to its original direction, for the streaming of audiovisual content to resume.

Figure 1B:
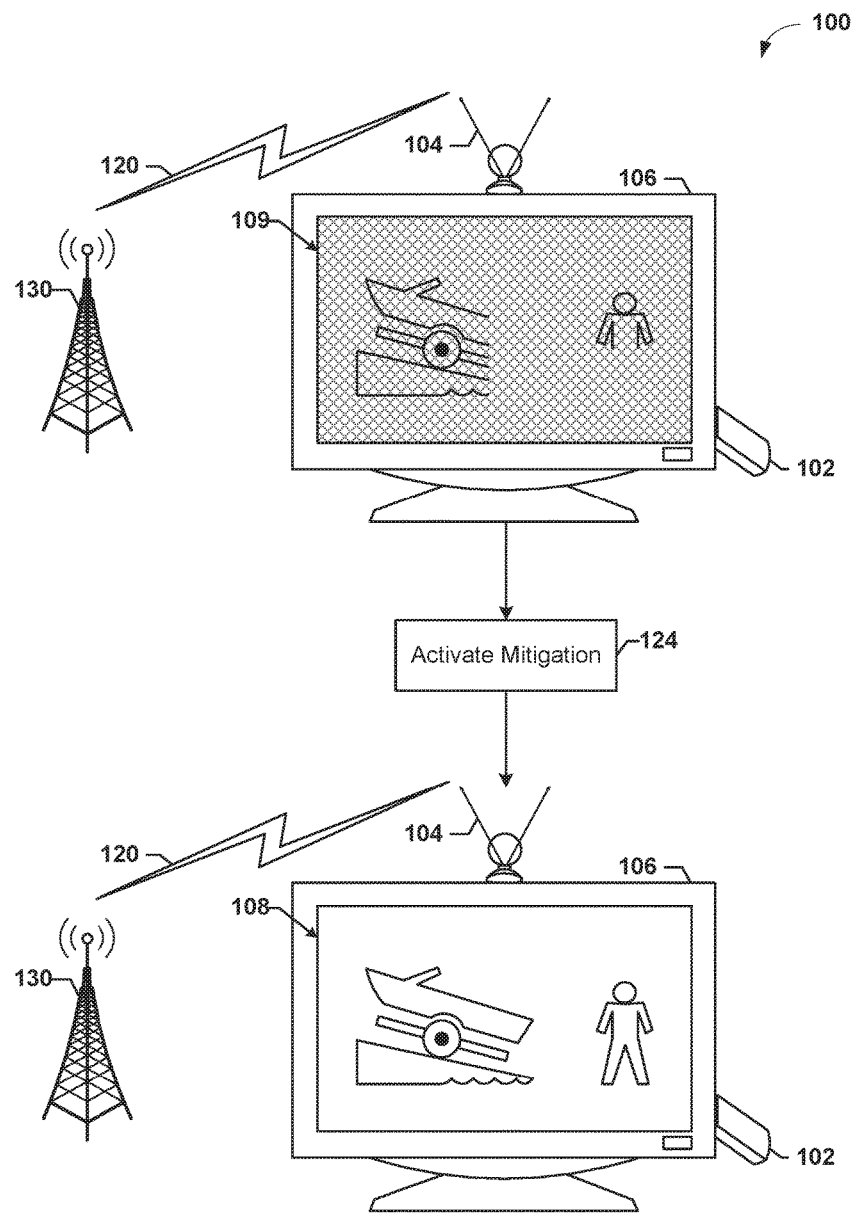

FIGS. 1A-1B illustrate an environment 100 where one or more devices may operate in accordance with one or more example embodiments of the disclosure. A display device 106 (e.g., television) may be equipped with a tuner that is connected to an antenna 104. The antenna 104 may be configured to receive a broadcast signal from the broadcast tower 130 over a communication link 120. Audiovisual data may be encoded on the broadcast signal. The tuner (e.g., television tuner) may be configured to amplify the signal received from the broadcast tower 130. Imagery 108 and associated sounds encoded on the broadcast signal may then be displayed or presented via the display device 106.

The display device 106 may be equipped with a variety of input ports configured to receive audiovisual data for presentation on the display device. A media streaming device 102 may be connected to the display device via said ports. For example, the media streaming device 102 may be a media streaming stick (or dongle) connected to the display device 106 via a High Definition Multimedia Interface (HDMI) port. The media streaming device 102 may be configured to stream content from a user device such as a laptop for presentation at the display device 106. In turn, the display device 106 displays said content. In one implementation, the media streaming device 102 is equipped with one or more Wi-Fi antennas configured for sending and receiving data to and from a user device providing content, such as an access point. In one implementation, the one or more Wi-Fi antennas may be one or more wireless local area network (WLAN) antennas.

A user may be able to select between different content sources and/or display device ports via a control device (radio frequency remote, infrared remote and/or the like). For example, the display device 106 may have the input port to which the antenna 104 is connected so that the imagery 108 and the associated sound received over the communication link 120 are presented via the display device 106. In some examples, once the media streaming device 102 is connected 122 to the display device 106, the displayed imagery from the broadcast signal received over the communication link 120 is degraded 109. In some examples, the media streaming device 102 may create interference with one or more devices, such as the tuner. In one example, the tuner is an Advanced Television Systems Committee (ATSC) tuner. In one example, the interference is created by a radiation pattern produced by the one or more Wi-Fi antennas and/or a transmitter of the media streaming device 102 in communication with the one or more Wi-Fi antennas. The radiation pattern may also be known as an antenna pattern or radiation power pattern. In some examples, the radiation pattern may have a main lobe direction (radiation pattern direction hereafter) that points towards the display device 106 and/or the tuner. In such examples, the power or noise radiating from the antenna may be amplified by the tuner. This causes noise data to be amplified, which in turn, may result in the degraded display imagery 109 based on the audiovisual data received over the communication link 120 overlapping with said noise data.

In one example, the media streaming device 102 may radiate noise (e.g, electron magnetic signal, electrical signal, and/or the like) from a connector port of the media streaming device 102. In one example, the media streaming device 102 connector port may be an HDMI connector port. The radiated noise may fall within the operational frequency bands of a television tuner. The television tuner may include an amplifier that amplifies the received signal as described above. In some examples, the amplifier may be saturated by the radiated noise. In some implementations, the tuner is an ATSC tuner. The radiated signal or noise may cause interference with the content received via the communication link 120 (e.g., degrade and/or interrupt) and displayed on the display device 106. In some embodiments, this interference is particularly pronounced when the port to which the media streaming device is coupled, such as the HDMI port, is in close proximity (e.g., within two to four inches) of the port to which the antenna 104 is coupled and/or of the tuner itself.

In order to overcome, at least, the above mentioned interruptions and problems, the media streaming device 102 may activate mitigation protocols 124 (FIG. 1B) in accordance with embodiments of the present disclosure. In an example embodiment, the media streaming device 102 may determine whether the media streaming device 102 is currently providing audiovisual content for display at the display device 106. Once the media streaming device 102 determines that the media streaming device 102 is currently not providing content for the display at the display device 106, the media streaming device 102 may activate particular mitigation protocols from the mitigation protocols disclosed herein.

In one example, a mitigation protocol may include suspending a particular type of module, circuitry, block, port, element or the like of the media streaming device 102. For example, the media streaming device 102 may suspend an HDMI module, circuitry, block, port, element or the like. In one implementation, suspending the HDMI module may include operating the module at power, current and/or voltage levels lower than the respective levels associated with a standard mode or active mode of operation (e.g., during streaming). In some implementations, suspending the HDMI module may include disabling or turning off the HDMI module. For example, a power management and provisioning module, circuitry, block, port, element or the like of the media streaming device 102 may not provide power to the HDMI module to turn off the HDMI module, or may provide less power to the HDMI module to suspend the HDMI module. In turn, this may reduce the interference with the television tuner which may result in a reduction or elimination of the degradation and/or interruptions in the display of content received by the antenna 104.

In one example, the mitigation protocol may include changing or switching the antenna radiation pattern of the media streaming device 102 such that the pattern is directed away from the display device 106 and/or the tuner. In one example, this may be achieved by utilizing beamforming techniques. For example, the media streaming device 102 may deactivate a first antenna having a first radiation pattern pointing towards the display device 106 and/or the tuner and activate a second antenna having a second radiation pattern pointing in a direction away from the display device 106 and/or the tuner (e.g., perpendicular to the display device). In turn, this may reduce the noise being amplified by the tuner and may reduce or eliminate the degradation and interruptions.

Similarly, in some embodiments, once the media streaming device 102 detects that content from the media streaming device 102 is to be displayed and/or is being displayed on the display device 106, the media streaming device 102 may revert the mitigation step or steps 124. For example, the media streaming device 102 may transition the HDMI module to an active or fully operational mode and/or switch the radiation pattern back to its original direction by activating the first antenna and deactivating the second antenna.

The media streaming device 102 may determine whether the media streaming device 102 is currently providing content for display at the display device 106 by utilizing a variety of different techniques. In one example, the media streaming device 102 may determine whether the media streaming device 102 is currently providing content for display at the display device 106 based on one or more control messages and/or signals received from the display device 106 by the media streaming device 102. For example, the control message or messages may include a Consumer Electronics Control (CEC) signal and/or an Extended Display Identification Data (EDID) signal. CEC messages generally provide control instructions to devices via an HDMI connection. Therefore, the media streaming device 102 may receive a CEC message instructing the device to pause, stop or halt streaming of content. In response to receipt of the CEC message, the media streaming device 102 may determine that the device is not currently providing content for display at the display device 106. The EDID signal may include data that identifies the display device 106 and the capabilities associated with the display device 106. Similarly, an EDID signal may be provided to the media streaming device 102 by the display device 106 only when the media streaming device 102 is to provide or is providing content for display at the display device 106. Accordingly, the media streaming device 102 may determine whether the media streaming device 102 is currently providing content for display at the display device 106.

In some implementations, the media streaming device 102 may determine whether the media streaming device 102 is currently providing content for display at the display device 106 based on a system current associated with the device. For example, a power management (and provisioning) module may measure or determine a system current associated with the power management module to determine which modules, subsystems, elements, blocks or the like of the media streaming device 102 are currently active. In one example, the power management module may determine a total system current and may determine based on the total current which modules, subsystems, elements, blocks or the like are active. For example, based on the overall system current, the media streaming device 102 may determine that the media streaming device 102 (or the HDMI module) is currently actively providing content to the display device 106. Similarly, based on the overall system current, the media streaming device 102 may determine that the media streaming device 102 (or the HDMI module) is currently not providing content to the display device 106. In some implementations, a threshold current associated with actively providing content may be stored on the media streaming device 102. If the media streaming device 102 determines that the overall system current or that the current provided to a specific module, subsystem, block or the like exceeds the threshold, the media streaming device 102 determines that the media streaming device 102 (or the HDMI module) is currently actively providing content to the display device 106. Conversely, if the determined current is less than the threshold, the media streaming device 102 may determine that the media streaming device 102 is currently not providing content for display to the display device 106.

In some implementations, the media streaming device 102 may determine whether the media streaming device 102 is currently providing content for display at the display device 106 based on a temperature associated with the device. For example, a temperature of the device may be measured or determined at a particular location of the device. In one implementation, the temperature may be an overall device temperature resulting from heat generated by the modules, subsystems, circuitry, blocks, elements and/or the like of the media streaming device 102, and measured or determined at a particular location of the media streaming device 102. In a different implementation, the temperature may be measured or determined for particular modules, subsystems, circuitry, blocks, elements and/or the like of the media streaming device 102. For example, the temperature of an HDMI module may be measured. Similarly, a temperature of the power management and provisioning module may be measured or determined. In one example, the temperature of a processor or a processing element of the media streaming device 102 may be measured or determined. Based on the temperature(s) measured or determined by the media streaming device 102, the media streaming device 102 may determine whether the media streaming device 102 is sending content to the display device 106 and/or which modules, subsystems, circuitry, blocks, elements and/or the like of the device are active. For example, a threshold associated with the heat levels or signatures of each module, subsystem, circuitry, block, element and/or the like for when the media streaming device 102 is sending content to the display device 106 may be stored in a data store of the media streaming device 102. The media streaming device 102 may then determine if a particular module is currently active based on comparing the stored data with the measured or determined temperature. If the threshold is exceeded by a particular module or combination of modules, then it may be determined that the media streaming device 102 is currently actively providing content to the display device 106. In another example, an overall device temperature may be measured or determined and compared to a threshold temperature to determine that the media streaming device 102 is currently actively providing content to the display device 106. Similarly, based on the overall device temperature or the temperature of particular modules or combination of modules, the media streaming device 102 may determine that the media streaming device 102 is currently not providing content to the display device 106. In some implementations, a threshold temperature associated with actively providing content is stored on the media streaming device 102. If the media streaming device 102 determines that the system temperature exceeds the above threshold, the media streaming device 102 may determine that the media streaming device 102 or a specific module of the media streaming device 102 (e.g., HDMI module) is currently actively performing operations to provide content to the display device 106. The media streaming device 102 may determine that the media streaming device 102 is currently not providing content for display to the display device 106 in a similar manner.

In some implementations, the media streaming device 102 may determine whether an encoder of the media streaming device 102 is active in order to determine if the media streaming device 102 is actively providing content for display at the display device 106. In one implementation, the media streaming device 102 may measure an electromagnetic field emitted from the encoder. The media streaming device 102 may then determine whether the media streaming device 102 is actively providing content for display at the display device 106 based on the electromagnetic field measurement. In some implementations, a threshold electromagnetic field strength level (e.g., radiation flux density) associated with actively providing content and/or the encoder being active is stored at the media streaming device 102. If the media streaming device 102 determines that the electromagnetic field measurement exceeds the above threshold, the media streaming device 102 determines that the media streaming device 102 is currently actively providing content to the display device 106. The media streaming device 102 may determine that the media streaming device 102 is currently not providing content for display to the display device 106 in a similar manner, for example, by determining that the electromagnetic field measurement is below the threshold.

A user device may transmit audiovisual data to the media streaming device over a wireless communication protocol, link and/or network. The media streaming device may be configured to receive audiovisual data from different user devices over multiple wireless communication protocols, thereby allowing multiple user devices to transmit audiovisual data to the media streaming device. In some embodiments, the media streaming device may be configured to monitor multiple wireless communication receivers for audiovisual data simultaneously or at least partially concurrently. In one implementation, the media streaming device may be configured to receive audiovisual data from a user device over a Wi-Fi wireless communication protocol, network, link and/or the like. For example, the media streaming device may be configured to receive audiovisual data from a user device over WLAN protocols.

The user may view the streamed content on a display device 106, including, but not limited to, a viewing device such as a television, a laptop computer, a tablet, a computer monitor, or the like. A display device 106 may include one or more devices configured to provide audio content, such as a speaker-type device configured to provide content, including, but not limited to, music, audio books, machine voice responses, spoken text, and/or any other type of audio content. In some example implementations, a media streaming device may be configured to communicate with a user device such as a laptop, a server, a tablet, a smartphone and/or the like, to receive audiovisual content (e.g., audio and/or visual content). In some implementations, a user device may communicate with a content providing device (e.g., hard drive, server, cable box) to receive audiovisual content and in turn provide the audiovisual content to the media streaming device via a wired or wireless connection.

The media streaming device may send and/or receive audiovisual data from a user device in accordance with a suitable communication protocol including, for example, a local area network (LAN) wireless communication protocol such as WiFi, Wi-Fi Direct, or a personal area network (PAN) such as Bluetooth™, or another wireless communication protocol as described herein. The media streaming device may, in turn, transmit the audiovisual content to the display device 106 via a wired connection. In one example, the media streaming device may be connected to a port from one or more ports of the display device 106. For example, the media streaming device may be connected to a television via an HDMI connector, a USB connector (USB, USB 2.0, USB 3.0), a firewire connector, CAT connector (e.g., CAT 5, CAT 6), a VGA connector, a component connector, a DVI connector, an RCA connector, an SPDIF connector, a coaxial connector or the like.

Illustrative Device Architecture

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media includes all computer-readable media (including volatile and non-volatile media).

In one embodiment, a non-volatile computer-readable storage medium may include a floppy disk, flexible disk, hard disk, solid-state storage (SSS) (e.g., a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMCs), secure digital (SD) memory cards, SmartMedia cards, CompactFlash (CF) cards, memory sticks or memory apparatus, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Media Streaming Device

Figure 2:
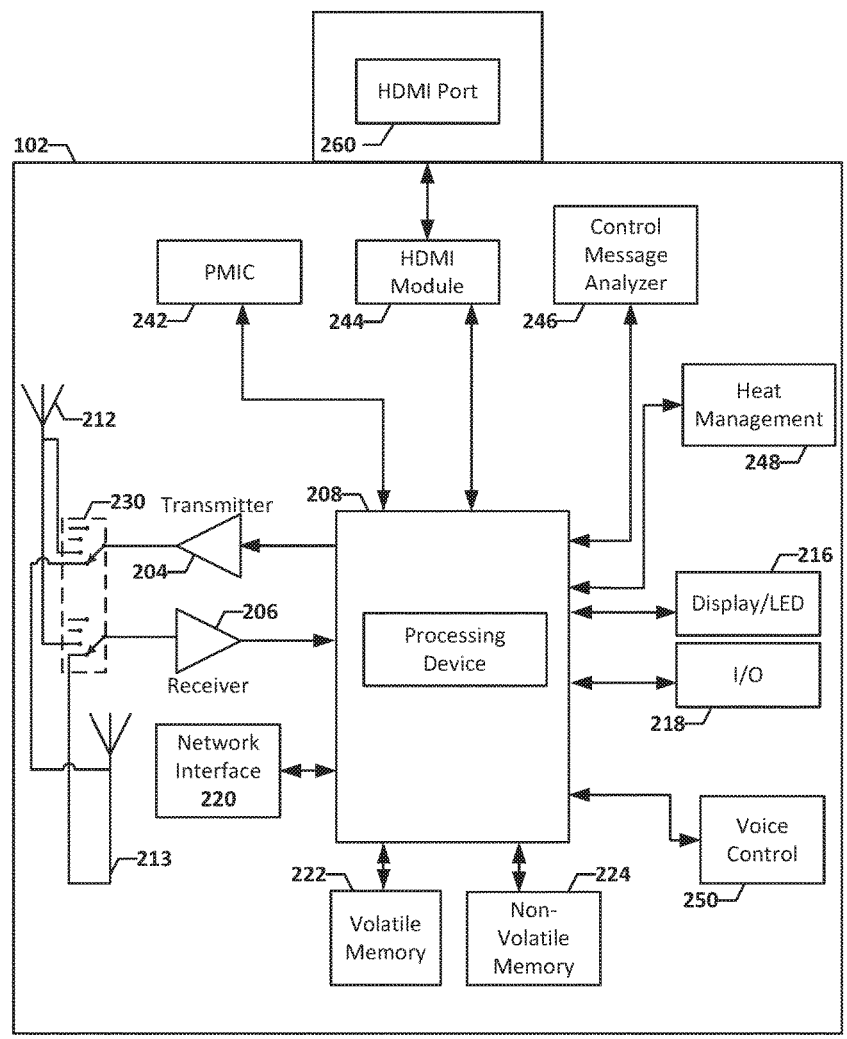
FIG. 2 illustrates an example schematic diagram of a media streaming device according to one or more example embodiments of the disclosure.

FIG. 2 illustrates an exemplary schematic diagram of a media streaming device 102 according to one or more example embodiments of the disclosure. In general, the terms processing device, computer, entity, system, and/or similar words used herein interchangeably may refer to, for example, one or more computers, computing entities, desktop computers, mobile phones, tablets, phablets, notebooks, laptops, distributed systems, gaming consoles, watches, televisions, dongles, servers or server networks, blades, gateways, switches, processing devices, processing entities, set-top boxes, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. Although the operations described herein may be described with reference to the media streaming device 102, such operations may be performed by other suitable devices, such as the devices discussed above.

Figure 4:
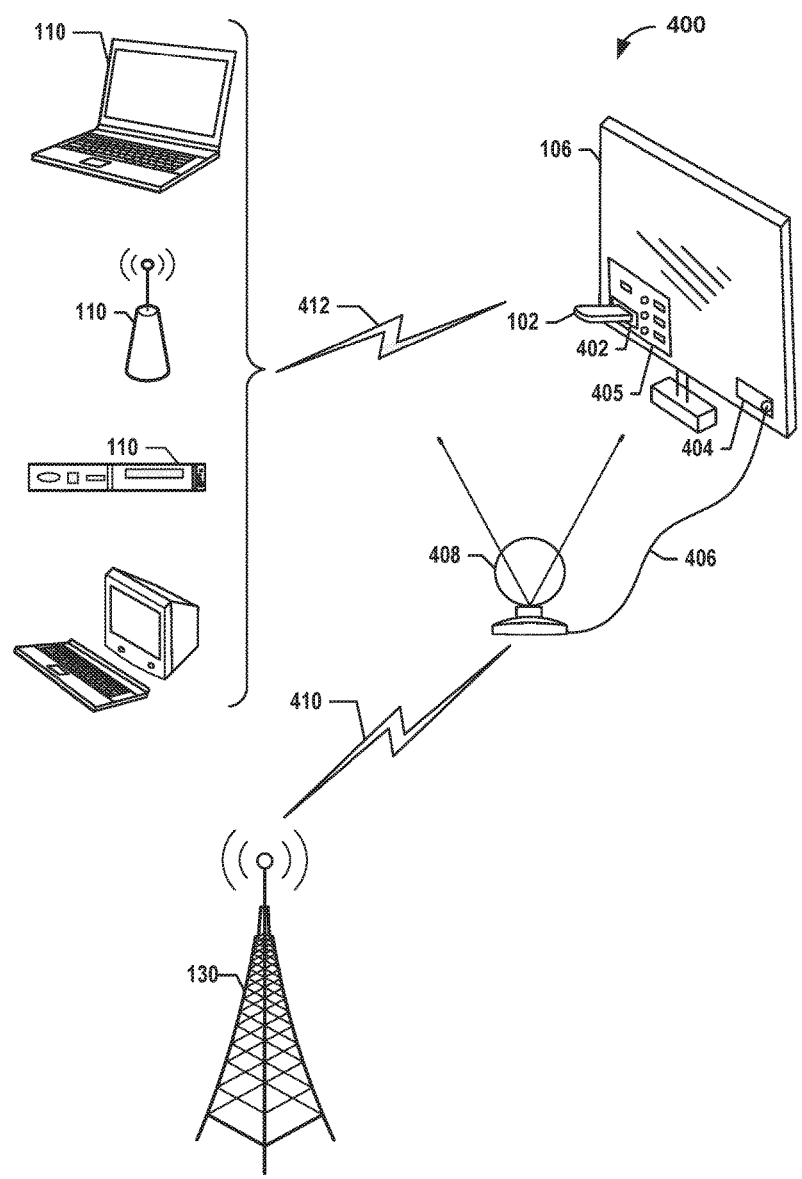
FIGS. 4, 5A and 5B illustrate example environments where one or more devices may operate in accordance with one or more example embodiments of the disclosure.

As indicated, in one embodiment, the media streaming device 102 may include one or more network interfaces 220 (e.g., communication interface) for communicating with various computing entities, such as by communicating data, content, information, and/or similar terms used herein interchangeably that can be transmitted, received, operated on, processed, displayed, stored, and/or the like. For instance, the media streaming device 102 may communicate with the display device 106 and/or other user devices 110 as shown in FIG. 4 (e.g., laptop, desktop, mobile device, wireless access point and/or the like).

As shown in FIG. 2, in one embodiment, the media streaming device 102 may include or be in communication with one or more processing devices 208 (also referred to as processors, processing circuitry, and/or similar terms used herein interchangeably) that communicate with other elements within the media streaming device 102 via a bus, for example. As will be understood, the processing device 208 may be embodied in a number of different ways. For example, the processing device 208 may be embodied as one or more complex programmable logic devices (CPLDs), microprocessors, multi-core processors, coprocessing entities, application-specific instruction set processors (ASIPs), microcontrollers, and/or controllers. Further, the processing device 208 may be embodied as one or more other processing devices or circuitry. The term circuitry may refer to an entirely hardware embodiment or a combination of hardware and computer program products. Thus, the processing device 208 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing device 208 may be configured for a particular use or configured to execute instructions stored in volatile or non-volatile memory or otherwise accessible to the processing device 208. As such, whether configured by hardware or computer program products, or by a combination thereof, the processing device 208 may be capable of performing steps or operations according to embodiments of the present invention when configured accordingly.

In one embodiment, the media streaming device 102 may further include or be in communication with non-volatile memory 224 (also referred to as non-volatile storage, memory storage, memory circuitry and/or similar terms used herein interchangeably). In one embodiment, the non-volatile memory 224 may include but not limited to hard disks, ROM, PROM, EPROM, EEPROM, flash memory, MMCs, SD memory cards, memory sticks or memory apparatus, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, a table and/or the like.

In one embodiment, the media streaming device 102 may further include or be in communication with volatile memory (also referred to as volatile storage, memory storage, memory circuitry and/or similar terms used herein interchangeably). In one embodiment, the volatile storage or memory may also include one or more volatile storage or memory media 222 including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing device 208. Thus, the databases, database instances, database management systems, data, applications, programs, program modules, scripts, source code, object code, byte code, compiled code, interpreted code, machine code, executable instructions, and/or the like may be used to control certain aspects of the operation of the media streaming device 102 with the assistance of the processing device 208 and an operating system.

As indicated, in one embodiment, the media streaming device 102 may also include one or more communications or network interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, HDMI, asynchronous transfer mode (ATM), frame relay, data over cable service interface specification (DOCSIS), or any other wired transmission protocol. Similarly, the media streaming device 102 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the media streaming device 102 may include or be in communication with one or more input elements, such as a keyboard input, a mouse input, a touch screen/display input, motion input, movement input, audio input, pointing device input, joystick input, keypad input, remote control input and/or the like. An input/output (I/O) module 218 may facilitate communication with such input devices. The media streaming device 102 may also include or be in communication with one or more output elements, such as audio output, video output, screen/display output, motion output, movement output, and/or the like. For example, in the depicted embodiment, the media streaming device 102 includes and is in communication with an HDMI port 260 (e.g., connector port, interface and/or the like) that may provide audiovisual data and content for presentation at the display device 106. The media streaming device 102 may also include one or more display devices 216 and/or LEDs that provide data associated with operation of the media streaming device 102. For example, a display panel may indicate that the media streaming device 102 is currently providing content for presentation at the display device 106. In one example, the media streaming device 102 may include one or more LEDs that blink when the media streaming device 102 is sending or receiving data from a streaming user device 110. Similarly, a solid LED light may be used to indicate that the media streaming device 102 is currently providing content for presentation at display device 216. As described, the display device 216 may for example be a touch screen configured to display content and receive input data.

The media streaming device 102 may also include a transmitter 204 and a receiver 206 configured to respectively send and receive signals via one or more antennas. In one implementation, a transceiver may be used to replace the transmitter 204 and the receiver 206. In one implementation, the transmitter 204 and the receiver 206 may be a Wi-Fi transmitter and a Wi-Fi receiver respectively. In one example, the transmitter 204 and the receiver 206 may operate at 2.4 GHz frequency. In one example, the transmitter 204 and the receiver 206 may operate at 5 GHz frequency. In some implementations, the transmitter 204 and the receiver 206 may be capable of selectively operating at 2.4 GHz and 5 GHz. As described herein, the transmitter 204 and/or the receiver 206 may interfere with or jam a tuner when active. In one example, the transmitter 204 and/or the receiver 206 may interfere with or jam ATSC and/or Very High Frequency (VHF) terrestrial broadcast. In one implementation, the terrestrial broadcast may be transmitted at frequency range between 400 MHz and 770 MHz. In some implementations, the terrestrial broadcast may be transmitted at a frequency range between 30 MHz and 300 MHz. In other examples, the broadcast may be transmitted at other frequencies.

The transmitter 204 and the receiver 206 may be connected to or in communication with the processing device 208. The transmitter 204 and the receiver 206 may also be connected to or in communication with a switching device 230 comprising one or more switches. The switching device 230 may be connected to or in communication with the processing device 208. The switching device 230 may also be connected to two or more antennas. For example, the switching device 230 may be connected to an antenna 212 and an antenna 213. The switching device 230 may include one or more switches operable to selectively connect one of the antennas 212 and 213 to the transmitter 204 and the receiver 206. Each antenna may be associated with a different radiation pattern and/or radiation patterns having different directions. The processing device 208 may provide a signal or instructions to the switching device 230 to switch between the antenna 212 and the antenna 213. For example, the switching device 230 may disconnect the antenna 212 from the transmitter 204 and the receiver 206 and connect the antenna 213 to the transmitter 204 and the receiver 206. During such operations the radiation pattern emitted from the media streaming device 102 and/or the antennas of the media streaming device 102 is changed or switched. In some implementations, a third and/or a fourth antenna (not shown) may be also connected to the switching device 230. This allows the processing device 208 to choose from, for example, three and/or four radiation patterns. In some implementations, even more antennas may be connected to the switching device 230. In some implementations, the processing device 208 may activate more than one antenna simultaneously. In other implementations, the processing device 208 may activate only a single antenna at any given time.

In some implementations, the antennas 212 and 213 may include, a Wi-Fi or an WLAN antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, one or more of the respective antennas 213 and 214 may be configured to transmit or receive radio frequency signals within any suitable frequency range forming part of the unlicensed portion of the radio spectrum. In one example, the media streaming device 102 may communicate with a user device 110 using a local area network (LAN) connection (e.g., WiFi Direct), a wired (e.g., Ethernet) or wireless (e.g., WiFi) connection to the Internet. Non-limiting examples of suitable antennas may include directional antennas, non-directional antennas, dipole antennas, folded dipole antennas, patch antennas, multiple-input multiple-output (MIMO) antennas and/or the like.

In some implementations, the antennas 212 and 213 may include, without limitation, a cellular antenna for transmitting or receiving signals to/from a cellular network infrastructure, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), 5G standards, direct satellite communications, or the like. Other example antennas include a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth.

The media streaming device 102 may include a Power Management Integrated Circuit (PMIC) module or circuitry 242. The PMIC 242 module may be a power management and provisioning module. The PMIC 242 may power the processing device 208 and/or other components of the media streaming device 102. For example, the PMIC 242 may power modules or components of the media streaming device 102. In some implementations, power to the device may be provided by the HDIM port 260, an internal or an external battery, and/or an internal or an external power source (e.g., wall outlet). The PMIC 242 is responsible for providing and/or routing the power to each of the modules or components of the media streaming device 102 based on their respective power ratings and requirements. The PMIC 242 may also monitor the current, voltage, and power consumption of each module or component. Accordingly, the PMIC 242 may determine which modules or components are currently performing operations based on the current, voltage and/or power consumption of the respective modules or components.

As described, the PMIC 242 may be an integrated circuit for managing power requirements of various modules and components of the media streaming device 102 and managing power distribution in the media streaming device 102. The PMIC 242 may be a solid state device that may control the flow and direction of electrical power within the media streaming device 102. The PMIC 242 may provide high efficiency power conversion that may minimize energy loss or heat. The PMIC 242 may have one or more functions including, but not limited to, DC to DC conversion, battery charging, power-source selection, voltage scaling, power sequencing, or other miscellaneous functions. The PMIC 242 may also include battery management, voltage regulation, and charging functions. It may include a DC to DC converter to allow dynamic voltage scaling. The PMIC 242 may use pulse-frequency modulation (PFM) or pulse-width modulation (PWM).

The media streaming device 102 may include one or more power switches (not shown), which may be operatively coupled to an ON/OFF button on the device to receive inputs from a user. The user inputs via the power button may cause the media streaming device 102 to transition from one mode to the other, such as transitioning from an active mode to a suspend mode or from a suspend or hibernate mode. In some implementations, such functions may be performed by a remote control device (RF remote control, IR remote control, mobile device remotely controlling media streaming device and/or the like). In some implementations, the device powering on and off may be automatically performed based on the power received at the HDMI port 260 and/or the PMIC 242. For example, if power is received by the media streaming device 102, the device may automatically power on.

The media streaming device 102 may also include an HDMI module or circuitry 244 connected to and/or in communication with the processing device 208. The HDMI module 244 may facilitate converting content streamed via receiver 206 into an HDMI signal for provisioning to the display device 106 via the HDMI port 260. The HDMI module 244 may generate uncompressed video and audio data for provisioning to the display device 106. In one example, when the media streaming device 102 is not actively providing audiovisual data and/or content for presentation at the display device 106, the HDMI module 244 may not actively perform the above operations. The PMIC 242 may detect that the HDMI module 244 is not actively performing these operations based on the system current, power consumption and/or voltage. Similarly, the PMIC 242 may detect that the HDMI module 244 is or is not actively performing the above steps based on monitoring the current, power consumption and/or voltage of the HDMI module independently and/or other modules or components individually or in combination. The media streaming device 102 may further include a heat management module or circuitry 248 connected to and/or in communication with the processing device 208. The heat management module 248 may be responsible for monitoring the heat levels of the media streaming device 102. The heat management module 248 may, for example, detect that the heat levels of the media streaming device 102 exceeded a threshold heat value and in response provide instructions to the processing device 208 to shut down the media streaming device 102. The threshold may be defined based on the expected operational heat levels of the media streaming device 102. The heat management module 248 may be equipped with one or more heat measuring devices (e.g., thermostat) comprising temperature sensors (e.g., thermistors, thermocouples, digital temperature sensors, thermal diodes, etc.) for monitoring the heat levels of the media streaming device 102. In one implementation, one or more sensors may be located in a central area of the media streaming device 102 to ensure that the heat measured corresponds to the heat produced by the components of the media streaming device 102. In some implementations, the heat management module 248 may monitor one or more of the components of the media streaming device 102 independently. For example, the heat management module 248 may monitor the processing device 208 independently. In some implementations, the heat management module 248 may monitor each component of the media streaming device 102 independently. Accordingly, the processing device 208 may determine based on the heat measurements of the heat management module 248 whether a particular component is currently active or operating. For example, the processing device 208 may determine that the HDMI module 244 is currently not performing operations to actively provide an HDMI signal for display at the display device 106 based on the measured heat levels of the media streaming device 102 and/or the HDMI module 244.

In some implementations, the processing device 208 may include a control message analyzer 246 for processing messages received from the display device 106 and/or other user devices 110. In the illustrated embodiment, the media streaming device 102 includes a control message analyzer 246 connected to and/or in communication with the processing device 208. The control message analyzer 246 may be responsible for processing and analyzing received messages and/or signals. In one implementation, the control message analyzer 246 may process and analyze CEC messages. In some examples, the control message analyzer may monitor receipt of control messages and/or signals, such as CEC messages. Similarly, in some examples, the control message analyzer may monitor receipt control signals or other signals, such as EDID signals. CEC messages allow HDMI devices to control one another when connected via an HDMI connection. A CEC message may be provided by the display device 106 to the media streaming device 102 instructing the media streaming device 102 to perform various playback functions (e.g., play, stop, pause, fast forward, rewind, slow motion and/or the like). The control message analyzer 246 may process the CEC messages to determine, for example, a respective playback operation to perform. For example, the control message analyzer 246 may instruct the processing device 208 to stop playback of content based on a CEC message. Accordingly, the processing device 208 may determine based on data received from the control message analyzer 246 whether a particular component is currently active (e.g., performing one or more operations). For example, the processing device 208 may determine that the HDMI module 244 is currently not performing operations to actively provide an HDMI signal for display at the display device 106 based on the data from the control message analyzer 246 instructing the processing device 208 to stop playback of content to the display device 106.

In some implementations, the media streaming device 102 may include an encoder/decoder (not shown) for encoding and decoding data onto signals. For example, an encoder may encode data onto a signal transmitted by the transmitter 204, and a decoder may decode data received at the receiver 206. Similarly, an encoder/decoder may be interfaced with the HDMI port 260 to encode/decode data sent/received via the HDMI port 260 based on the type of port and/or the input/output module 218. The processing device 208 may determine whether an encoder is actively performing operations based on an electromagnetic field measurement proximate to the encoder. If the encoder is not active, the processing device 208 may determine that the media streaming device 102 is not currently providing content for display at the display device 106.

A voice control module 250 may be connected to and/or in communication with the processing device 208. The voice control module 250 may be in communication with a user device 110 (e.g., mobile phone, laptop, tablet, remote control and/or the like) via a wireless communication protocol. For example, the voice control module 250 may be in communication with the user device 110 via Bluetooth. The voice control module 250 may receive voice data from the user device 110. The voice control module 250 may, in turn, provide instructions associated with the received voice data to the processing device 208. For example, the voice control module 250 may process voice commands or requests provided by the user device 110 to determine actions associated with the voice commands and/or requests. In turn the processing device 208 may perform said actions. For example, the voice commands may request initiation of a playback function (stop, pause, rewind, fast forward, slow motion and/or the like), content search and/or similar functions. For example, in response to receiving a voice command associated with stopping playback, the processing device 208 may stop playback of content. In one example, a user interface presented on the user device 110 may include a voice search button (not shown) configured to facilitate voice-based content searching. The user interface of the user device 110 may also include a search result designation button (not shown) configured to allow for designation of whether search results of the voice-based content searching should be displayed on the display device 106. The user device 110 may also include a microphone for voice or sound input, as described herein. The interface may also facilitate providing to the media streaming device 102 similar commands and/or instructions via non-voice-based interactions with the user interface (e.g., pushing a button on the user device 110 and/or on a touch screen of the user device 110).

As will be appreciated, one or more of the media streaming device 102 modules or components may be located remotely from other media streaming device 102 components, such as in a distributed system. Furthermore, one or more of the components may be combined and additional components performing functions described herein may be included in the media streaming device 102. Thus, the media streaming device 102 can be adapted to accommodate a variety of needs and circumstances. As will be recognized, these architectures and descriptions are provided for exemplary purposes only and are not limiting to the various embodiments. For example, the media streaming device 102 may be embodied as a stick, dongle, box, console, television and/or the like.

Display Devices and User Devices

A user may be an individual, a family, a company, an organization, an entity, a department within an organization, a representative of an organization and/or person, and/or the like. In one example, users may be employees, residents, customers, and/or the like. For instance, a user may operate a user device 110 and/or the display device 106 that includes one or more components that are functionally similar to those of the media streaming device 102.

Figure 3:
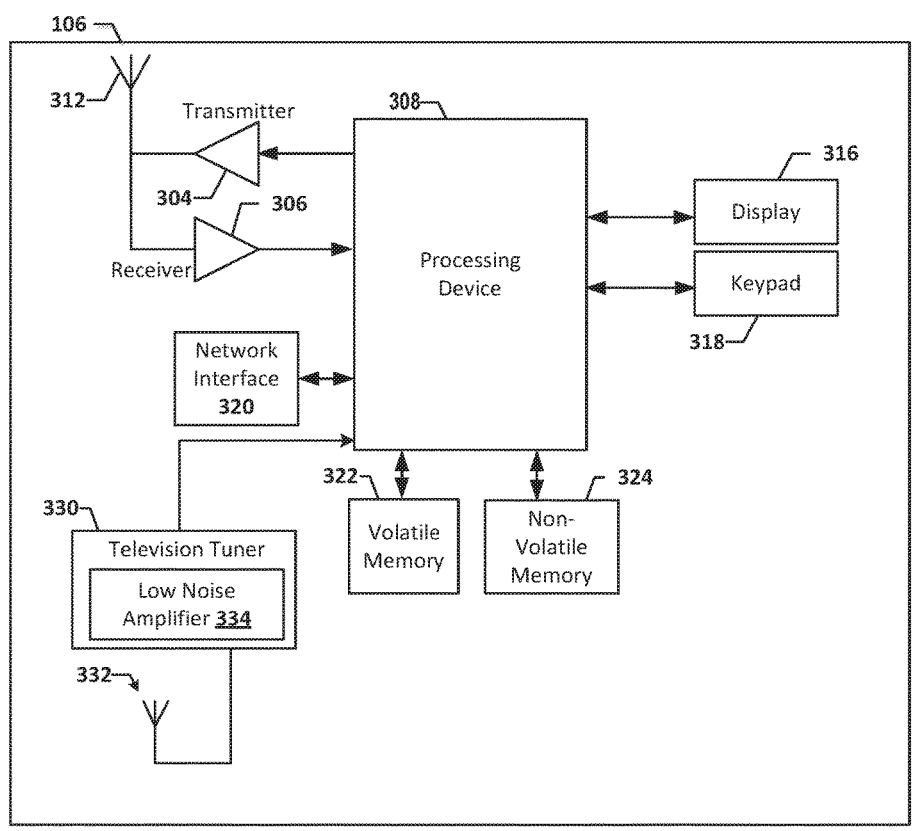
FIG. 3 illustrates an example schematic diagram of a display device according to one or more example embodiments of the disclosure.

FIG. 3 illustrates an example schematic diagram of a display device 106 according to one or more example embodiments of the disclosure. Generally, an example schematic of a user device 110 may be similar to the schematic of the display device 106 depicted at FIG. 3. In general, processing device, computer, entity, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The user device 110 and/or the display device 106 can be operated by various parties. As shown in FIG. 3, the display device 106 can include an antenna 312, a transmitter 304 (e.g., radio), a receiver 306 (e.g., radio), and a processing device 308 (e.g., CPLDs, microprocessors, multi-core processors, co-processing entities, ASIPs, microcontrollers, and/or controllers) that provides signals to and receives signals from the transmitter 304 and the receiver 306, respectively. In some implementations, the user device 110 and/or display device 106 may include a television tuner 330. The television tuner 330 may be responsible for demodulate and/or decompress a broadcast signal to extract the encoded video and/or audio data on the broadcast signal. In turn, this may allow users to view broadcast channels. The tuner 330 may amplify the signal to ensure that the power of the signal is sufficient for displaying audiovisual content. The tuner 330 may be accompanied by additional circuitry that facilitates the operations above. In one example, the tuner 330 may include an ATSC tuner. In one implementation, the tuner 330 may include a low noise amplifier 334. In one implementation, the tuner 330 may be configured to receive Very High Frequency (VHF) signals and/or the like. In one example, tuner 330 may be in communication with or connected to an internal antenna 322 and/or an external antenna. The antenna 322 may facilitate receipt of audiovisual data over broadcast airwaves.

The signals provided to and received from the transmitter 304 and the receiver 306, respectively, may include signaling information in accordance with air interface standards of applicable wireless systems. In this regard, the display device 106 may be capable of operating with one or more air interface standards, communication protocols, modulation types, and access types. More particularly, the display device 106 may operate in accordance with any of a number of wireless communication standards and protocols, such as those described above with regard to the media streaming device. In a particular embodiment, the display device 106 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the display device 106 may operate in accordance with multiple wired communication standards and protocols, such as those described above with regard to the media streaming device 102 via a network interface 320.

Via these communication standards and protocols, the user device 110 and/or the display device 106 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 and/or the display device 106 can also download changes, add-ons, and updates, for instance, to its firmware, software (e.g., including executable instructions, applications, program modules), and operating system.

According to one embodiment, the user device 110 and/or the display device 106 may include location determining aspects, devices, modules, functionalities, and/or similar words used herein interchangeably. For example, the user device 110 and/or the display device 106 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user devices 110 position in connection with a variety of other systems, including cellular towers, Wi-Fi access points, and/or the like. Similarly, the user device 110 and/or the display device 106 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 and/or the display device 106 may also comprise a user interface (that can include a display 316 coupled to a processing device 308) and/or a user input interface (coupled to a processing device 308). For example, the user interface may be a user application, browser, user interface, and/or similar words used herein interchangeably executing on and/or accessible via the user device 110 and/or the display device 106 to interact with and/or cause display of information from the media streaming device 102, as described herein. The user input interface can comprise any of a number of devices or interfaces allowing the user device 110 and/or the display device 106 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the user device 110 and/or the display device 106 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 and/or the display device 106 can also include volatile memory 322 and/or non-volatile memory 324, which can be embedded and/or may be removable. For example, the non-volatile memory may be ROM, PROM, EPROM, EEPROM, flash memory, MMCs, SD memory cards, memory sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the user device 110 and/or the display device 106. As indicated, this may include a user application that is resident on the respective device or accessible through a browser or other user interface for communicating with various other computing entities.

In another embodiment, the user device 110 and/or the display device 106 may include one or more components or functionality that are the same or similar to those of the media streaming device 102, as described in greater detail above. As will be recognized, these architectures and descriptions are provided for exemplary purposes only and are not limiting to the various embodiments. It should be understood that the components and operations of the media streaming device 102 can be implemented in the display device 106 and/or a user device 110.

Example Operation of Illustrative Example Embodiments

FIG. 4 illustrates an example environment 400 where one or more devices may operate in accordance with one or more example embodiments of the disclosure. As discussed above, a display device 106 such as a television may be equipped with a tuner 404 (e.g., television tuner) for viewing broadcast channels. In one example, a broadcast tower 130 may broadcast a broadcast signal for receipt by multiple display devices 106. The broadcast tower 130 may provide a broadcast signal carrying encoded video and/or audio data corresponding to one or more channels. In one implementation, the broadcast is an ATSC terrestrial broadcast. In other implementations the broadcast may be one of PAL, NTSC, ATSC, SECAM, DVB-C, DVB-T, DVB-T2, ISDB, T-DMB broadcasts and/or the like. In one implementation, the broadcast signal may have a frequency range of 400 MHz to 770 MHz. It should be understood that in general, different countries and regions have terrestrial broadcasts that occupy different frequency ranges. For example, in a different implementation, the broadcast signal may have a frequency range of 470 MHz to 890 MHz. Yet in other implementations, the broadcast signal may be the VHF band that occupies the frequency ranges of 54 MHz to 216 MHz, 54 MHz to 88 MHz and/or 174 MHz to 216 MHz. In other implementations still, different suitable frequency ranges may be used based on the region of operation, type of broadcast and/or the like.

Antennas such as an antenna 408 may be configured to receive the broadcast signal via a communication link 410 wirelessly. The antenna 408 may be connected to the tuner 404, by a cable 406, such that the received broadcast signal is transmitted to the tuner 404. The tuner 404 may perform one or more operations on the received signal in order to prepare the content encoded on the signal for display at the display device 106. The tuner 404 may be configured to transmit received signals that fall within a configurable frequency range and reject signals that are outside the configurable range. The tuner 404 may amplify the signal to ensure that the power of the signal is sufficient for displaying audiovisual content on the display device 106. The tuner 404 may demodulate and/or decompress the signal to extract the encoded video and/or audio data on the broadcast signal. The tuner 404 may be accompanied by additional circuitry that facilitates the operations above. In some implementations, the tuner 404 may be built in or may be a component of the display device 106. In other implementations, the tuner 404 may be an external device connected to the display device 106.

In some implementations, the media streaming device 102 is a module, component, subsystem, block or the like of the display device 106. In the depicted implementation, the media streaming device 102 is an external device to the display device 106. In one implementation, the media streaming device 102 may be configured for connection to an HDMI port 402, of input/output ports 405, of the display device 106 via the HDMI port 260 of the media streaming device 102. In a different implementation, the media streaming device 102 may be configured for connection to a USB port, or another type of port suitable for transferring audiovisual data as described above.

In the depicted implementation, the user device 110 may be a laptop, a tablet, a computer, a hard drive, Wi-Fi access point, or a mobile phone. The user device 110 may provide audiovisual content to the media streaming device 102 over a communication link 412. In the depicted implementation, the communication link 412 may be a Wi-Fi or a WLAN link. In other implementations, the communication link 412 may be a different suitable wireless communication link as described above. Content may be streamed through the communication link 412, by the media streaming device 102, for display at the display device 106.

The user may provide input, to a remote control for example, that controls playback functions of content streamed. The user may also use the remote control to switch between the different inputs of the display device 106. For example, at any time the user may switch the display device 106 input from the tuner 404 to HDMI port 402 and vice versa.

In some examples, display and/or viewing of broadcast content transmitted over the communication link 410 may be interrupted or distorted if the media streaming device 102 is connected to the display device 106. In one example, signal and/or noise may radiate from the HDMI port 260 into the tuner 404 and/or other ports. In some examples, the radiated noise may interfere with other signals and/or ports selected for display on the display device 106. In some examples, the radiated noise may interfere with other devices, such as the tuner 404. For example, the radiated noise may be amplified and decoded by the tuner 404 during the operations described above. This distorts the content being displayed at the display device 106. In some examples, the radiated noise may cause other devices, such as the tuner 404, to not function properly. For example, the radiated noise may drive unwanted current within the circuitry of the tuner 404. In turn, such currents may hinder the operations being performed by the tuner 404 and in some cases may damage the tuner. For example, the radiated noise may be amplified by the tuner 404 and in turn saturate an amplifier of the tuner 404 such that the amplifier no longer amplifies the broadcast signal appropriately.

In order to resolve the above problems, the media streaming device 102 may determine when the HDMI port 260 is not in use and suspend or turn off the HDMI module 244. In one example, the PMIC 242 may provide less power to the HDMI module 244 when suspended than when active. In other implementations, the PMIC 242 may provide no power to the HDMI module 244 when suspended. In turn, the radiation noise emitted from the HDMI port 260 is reduced or eliminated allowing normal viewing of the broadcast channels, for example, to resume. There are multiple methods and operations that allow the processing device 208 to determine that the HDMI functions are not currently in use (e.g., the user is not currently streaming media via the media streaming device 102).

In one implementation, the media streaming device 102 may determine that the HDMI functions of the media streaming device 102 are not currently being used or needed based on messages or signals received from the display device 106. For example, the media streaming device 102 may receive periodically or continuously an EDID information from the display device 106 identifying the display device and including data associated with the display device. In one example, the media streaming device 102 may monitor for receipt of EDID signals and/or messages periodically (e.g., every 1 second, 3 seconds and or the like). In some implementations, the EDID signal is provided continuously and monitored periodically as discussed above. When EDID information is being sent, the media streaming device 102 may determine that the media streaming device is currently providing content to the display device 106 via the HDMI port 260. However, when EDID information is not being sent to or received by the media streaming device 102, the media streaming device 102 may determine that the media streaming device 102 is currently not providing content to the display device 106 via the HDMI port 260 and, in turn, suspend or disable the HDMI module 244. In one example, the media streaming device may determine that EDID information is not actively being sent by determining that no EDID information was received for a predetermined period of time. In one example, the predetermined period of time may be configurable. In one example, the predetermined period of time may be 1 second, 3 seconds, 5 seconds and/or the like. In some examples, once the media streaming device 102 starts to receive EDID information again, the media streaming device 102 may activate, unsuspend or turn on the HDMI module 244.

CEC messages generally allow multiple devices connected via an HDMI connection to control one another. For example, the display device 106 may control the media streaming device 102 by CEC messages and vice versa. In one example, the media streaming device 102 may receive a CEC message instructing the device to pause, stop or halt streaming from the display device 106. In response to receipt of the CEC message, the media streaming device 102 may determine that the device is not currently providing content for display at the display device 106 and that the HDMI functions of the media streaming device are not currently needed. In turn, the media streaming device 102 may suspend or disable the HDMI module 244. In a different implementation, the media streaming device 102 may send the CEC message to the display device 106 to disable or suspend the port 402. In some examples, once the media streaming device 102 receives the CEC message including instructions to resume streaming of content, the media streaming device 102 may activate, unsuspend, or turn on the HDMI module 244. Similarly, the media streaming device 102 may provide a CEC message instructing the display device 106 to reactivate the port 402.

The current, power, and/or voltage consumption of the media streaming device 102 is different when the device is actively streaming content and when it is not actively streaming content. For example, when the media streaming device 102 is actively streaming content, the system current of the media streaming device 102 may be higher than the system current of the media streaming device 102 when the media streaming device 102 is not actively streaming content (e.g., television is displaying broadcast channel). The expected current during each mode of operation may be stored at the media streaming device 102 (e.g., volatile memory 222 and/or non-volatile memory 224). It should be understood that the expected currents during the different modes of operations may vary based on the features, capabilities, size and/or the like of the media streaming device 102. Accordingly, different expected currents during different modes of operation may be stored in association with a particular media streaming device 102 identifier locally or remotely. The media streaming device 102 may determine based on the system current determined by the PMIC 242 whether the streaming device is actively providing content for display at the display device 106. In some implementations, the expected current during active streaming may be 300 mA. In some implementations, the expected current when streaming is not active is 100 mA. In some implementations, a threshold range for currents may be defined for each mode of operations. For example, if the measured system current is between 50 mA and 150 mA, the media streaming device 102 may determine that the media streaming device 102 is not actively streaming content and, in turn, suspend or turn off the HDMI module 244. Similarly, if the measured current is between 250 mA and 350 mA, the media streaming device 102 may determine that the media streaming device 102 is actively streaming content or about to initiate and/or resume streaming of content. In turn, the device may unsuspend or turn on the HDMI module 244. For example, if the measured system current is 105 mA, the media streaming device 102 may determine that the media streaming device 102 is not actively streaming content and, in turn, suspend or turn off HDMI module 244. Similarly, if the measured current is 320 mA, the media streaming device 102 may determine that the media streaming device 102 is actively streaming content or about to initiate and/or resume streaming of content. In turn, the device may unsuspend or turn on the HDMI module 244 to, for example, resume streaming content. Other suitable current ranges may be used.

The temperature produced by the media streaming device 102 is different when the device is actively streaming content and when it is not actively streaming content. For example, when the media streaming device 102 is actively streaming content, the temperature of the media streaming device 102 may be higher than the temperature of the media streaming device 102 when the media streaming device 102 is not actively streaming content (e.g., television is displaying a broadcast channel). The expected temperature during each mode of operation may be stored at the media streaming device 102 (e.g., volatile memory 222 and/or non-volatile memory 224). It should be understood that the expected temperature during the different modes of operations may vary based on the features, capabilities, size and/or the like of the media streaming device 102. Accordingly, different expected temperatures during different modes of operation may be stored locally or remotely in association with a particular media streaming device 102 identifier. The media streaming device 102 may determine based on the device temperature determined by the heat management module 248 whether the streaming device is actively providing content for display at the display device 106. In some implementations, the expected temperature during active streaming may be 61° C. and 55° C. when streaming is not active. In some implementations, a threshold range for temperatures may be defined for each mode of operations. For example, if the measured device temperature is between 51° C. and a 57° C., the media streaming device 102 may determine that the device is not actively streaming content and, in turn, may suspend or turn off the HDMI module 244. Similarly, if the measured temperature is between 58° C. and a 65° C., the media streaming device 102 may determine that the device is actively streaming content or about to initiate and/or resume streaming of content. In turn, the device may unsuspend or turn on the HDMI module 244. For example, if the measured device temperature is 56° C., the media streaming device 102 may determine that the device is not actively streaming content and, in turn, may suspend or turn off the HDMI module 244. Similarly, if the measured temperature is 63° C., the media streaming device 102 may determine that the device is actively streaming content or about to initiate and/or resume streaming of content. In turn, the device may unsuspend or turn on the HDMI module 244 In turn, the device may unsuspend or turn on the HDMI module 244 to, for example, resume streaming content. Other suitable temperature ranges may be used. In some implementations, the media streaming device 102 temperature is the overall temperature of the media streaming device 102 measured at a central location by the heat management module 248. In a different implementation, the overall media streaming device 102 temperature may be an average or a sum of multiple temperatures measured at different locations of the media streaming device 102 by, for example, the heat management module 248.

In a different implementation, the temperature may be measured at particular modules, subsystems, circuitry, blocks, elements and/or the like of the device. For example, the temperature of an HDMI module 244 may be measured. Similarly, a temperature of the PMIC module 242 may be measured. In one example, temperature of a processor or a processing device 208 of the media streaming device 102 may be measured. Based on the temperature(s), the media streaming device 102 may determine which modules, subsystems, circuitry, blocks, elements and/or the like of the device are active. For example, the heat levels or signatures of each module, subsystem, circuitry, block, element and/or the like may be stored in a data store of the media streaming device 102 or remotely in a lookup table or a database. The media streaming device 102 may then determine if a particular module is currently active based on comparing the stored data with the measured temperature in a manner similar to the implementation described above.

Figures 5A, 5B:
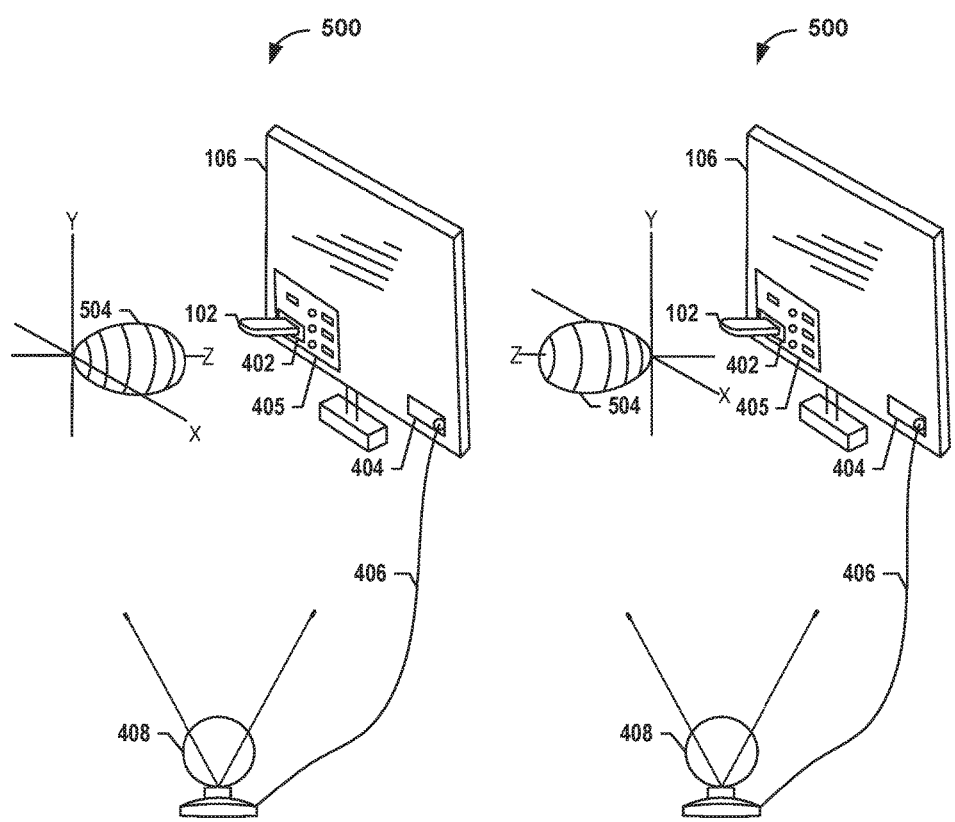

FIG. 5 illustrates an example environment 500 where one or more devices may operate in accordance with one or more example embodiments of the disclosure. FIG. 5 depicts elements similar to the elements described above with reference to FIG. 4 (e.g., tuner 404, the media streaming device 102, the display device 106, the antenna 408 and the like). Operations associated with these elements are generally similar to the operations described above with reference to FIG. 4. In the depicted embodiment, the media streaming device 102 may produce a radiation pattern 502, such as may be associated with Wi-Fi communications over link 412 with a user device 110, wherein the radiation pattern 502 is directed toward components of the display device 106. For example, the main dipole of the radiation pattern 502 may be incident on and intersects with the display device 106 or a plane spanned by the display device 106. In one example, the main dipole of the radiation pattern 502 may be perpendicular to a plane spanned by the back of the display device 106. For example, the main dipole or the radiation pattern 502 may be in a direction substantially perpendicular to the back of the display device 106. In the depicted embodiment, the radiation pattern 502 is directed at and/or intersecting with the tuner 404. The radiation pattern 502 may cause noise to be radiated into the tuner 404 and, in turn, amplified. As described, this interferes with and degrades the display of content received via the communication link 410.

In one implementation, the media streaming device 102 may be equipped with a first antenna 212 having a radiation pattern, such as pattern 502, directed toward the display device 106 and/or the tuner 404. In some implementations, the radiation pattern is directed in a direction perpendicular to the display device 106. In some implementations, the radiation pattern is directed in a direction that crosses a plane parallel to the back of the display device 106. Similarly, the media streaming device 102 may be equipped with a second antenna 213 having a radiation pattern directed in a different direction substantially away from the display device 106 and/or the tuner 404, such as the a radiation pattern 504. In one implementation, the radiation pattern of the second antenna 213 is a substantially opposite direction to the direction of the radiation pattern of the first antenna. For example, the radiation pattern of the second antenna is not incident on or intersecting with the tuner 404 of the display device 106. In one example, directing the radiation pattern away from display device 106 may reduce the power of the radiation noise that reaches tuner 404 or display device 106. In turn, this may reduce the interference between the media streaming device 102 and display device 106 and/or tuner 404. In one implementation, the radiation pattern of the second antenna 213 is perpendicular to the direction of the radiation pattern of the first antenna. In one implementation, the radiation patterns of the antennas 212 and 213 are fixed. In one implementation, in response to detecting that the media streaming device 102 is not actively streaming content based on, for example, one or more of the above operations, the processing device 208 may provide instructions to the switching device 230 to disconnect the antenna 212 and connect the antenna 213 to the transmitter 204 and the receiver 206. Activating the antenna 213 and deactivating the antenna 212 causes the radiation pattern 502 associated with the antenna 212 to change to a radiation pattern 504 associated with the antenna 213. Note that the radiation pattern 504 in the depicted embodiment is directed substantially away from the display device 106 and the tuner 404 and is in a substantially opposite direction to the radiation pattern 502.

In some implementations, beamforming techniques are used to control one or more antennas (e.g., antennas 212 and 123) in order to produce different radiation patterns. In one implementation, each antenna may be associated with a different phase. For example, the radiation pattern produced by the antenna 212 may have a different phase than that of the radiation pattern produced by the antenna 213. When two or more antennas are activated simultaneously (e.g., connecting the antennas to a transmitter/receiver), the radiation pattern from the antennas is combined to produce a resultant pattern based on the interference between the radiation patterns associated with each of the two or more antennas. Naturally, when more antennas are used for beamforming, more radiation patterns and/or directions are available for selection based on the activated antenna. For example, a two antenna array may allow for three different radiation patterns (e.g., first antenna is activated, second antenna is activated, both antennas are activated). However, a three antenna array may allow for six different radiation patterns. In some implementations, the array may be incorporated in a single antenna having multiple components (e.g., arms). For example, a two antenna system may be replaced with a dual arm antenna where each arm is configured to selectively connect to the transmitter 204 and/or the receiver 206. The operation of this implementation is generally similar to the dual antenna implementation.

In some implementations, the antennas 212 and 213 may be dynamically configured to change their respective radiation pattern. In one implementation, the media streaming device 102 may determine a location of a metal back panel of the display device 106 relative to the location of the media streaming device 102. In some implementations, each of the antennas 212 and 213 is connected to an adjustable phase shifter (not shown) that may be used collectively to change the resultant radiation patterns and the direction of the radiation patterns. In one implementation, during a boot up period of the media streaming device 102, the device provides instructions to the antennas 212 and 213 to be configured to generate the radiation patterns 502 and 504 respectively. In one implementation, the media streaming device 102 determines the location of the metal back panel of the display device 106 by determining a reflection pattern of a plurality of signals transmitted by the media streaming device 102 in various directions. In a different implementation, the media streaming device 102 determines the location of the metal back panel of the display device 106 measuring an electromagnetic field signature proximate to the display device 106. In some implementations, the media streaming device may monitor the Wi-Fi signal emitted from a Wi-Fi access point. Based on the strength of the emitted signal the media streaming device 102 may determine the location of the access point relative to the display device.

In some implementations, a tuner may be located in a different audiovisual content source. For example a tuner may be embedded or may be part of a set-top box. In such implementations, the antenna 213 may have a radiation pattern directed in a direction away from the set-top box to mitigate the interference between the media streaming device 102 and the set-top box.

In some implementations, the media streaming device 102 may actively monitor the radiation noise levels from the device to determine when to dynamically activate one of antennas 112 and 113. In some implementations, the noise levels are monitored periodically (each second, three seconds, 20 seconds and/or the like). In some implementations, the radiation patterns may be also changed dynamically. In some implementations, additional antennas may connected to switching device 230 to provide more flexibility in choosing the direction of the radiation pattern. For example, in situations when a display device 106 is equipped with side panel input ports, a third antenna (not shown) may be associated with a third radiation pattern which may be connected to the switching device 230. The media streaming device 102 may determine based on the control messages and signals described above whether the media streaming device 102 is connected to the back panel 405 of the display device 106 or the side panel of the display device 106, and select whether to activate the antenna 212 or the third antenna (not shown) accordingly. For example, if the media streaming device 102 is connected to the side port, the processing device 208 may instruct switching device 230 to activate the third antenna (not shown).

Illustrative Processes

Figure 6:
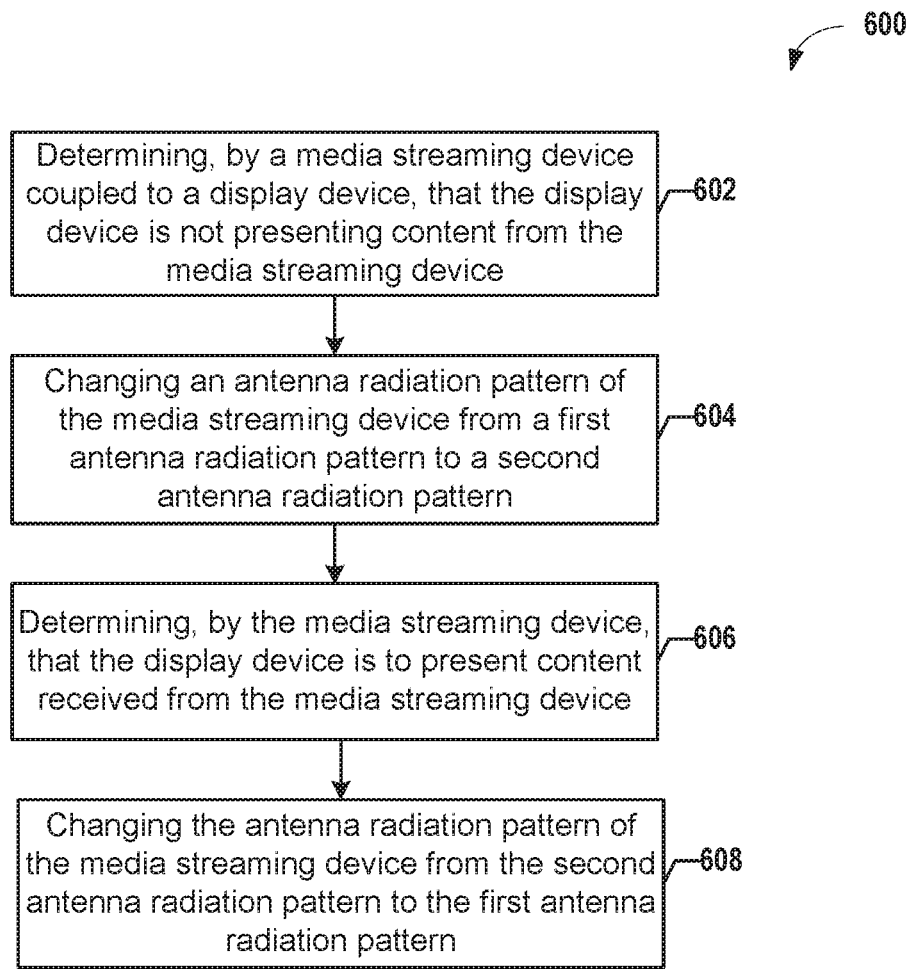
FIGS. 6-8 are flowcharts illustrating various procedures and operations that may be completed in accordance with various embodiments of the disclosure.

FIG. 6 is a flowchart of an example process 600 in accordance with various embodiments of the disclosure. The process 600 begins with determining, by a media streaming device coupled to a display device, that the display device is not presenting content from the media streaming device (602). For example, the process 600 may begin with determining that a media streaming device 102 (e.g., streaming media stick, streaming media box or the like) is not actively providing content for display at a television set. A user (e.g., television viewer) may use a remote control device (e.g., remote control, mobile device) to provide instructions to the television to switch between different sources and/or input ports. While the media streaming device 102 is connected to the television, the user may decide to watch a broadcast channel. In such an example, a determination may be made that the media streaming device is not providing content to the television. streaming device 102 is connected to the television and in an operational mode, even though the television is not displaying content from the media streaming device 102, the wireless communications of the media streaming device 102 may create noise and/or interfere with the terrestrial broadcast signals, such as Very High Frequency (VHF) signals and/or other high frequency signals, received via antenna 332, and/or the operation of a television tuner 330 of the television that receives and processes such signals, and in turn, jam, block and/or degrade viewing of an associated broadcast by the television. In one example, the tuner is an ATSC tuner. In one example the noise interference may interfere with other terrestrial broadcasts occupying other frequency ranges.

To mitigate these issues and/or problems, the process 600 may continue with changing an antenna radiation pattern of the media streaming device from a first antenna radiation pattern to a second antenna radiation pattern (604). As described above the changing of antenna patterns may rely on beamforming techniques. For example, in order to switch the antenna radiation pattern, the process 600 may provide instructions to activate one or more antennas and deactivate one or more different antennas. In one example, the process 600 may deactivate a first antenna having a first antenna radiation pattern and activate a second antenna having a second radiation pattern. In some implementations, the second radiation pattern is in a direction opposite the first radiation pattern. In some implementations, the second radiation pattern is separated by 90 degrees from the first radiation pattern. Generally, the first and second patterns are oriented in different directions. In one example, the first pattern may be directed substantially toward the television while the second pattern is directed substantially away from the television. Changing the direction of the radiation pattern to be away from the television minimizes or eliminates the interference with the television tuner 330. Once the user stops watching the broadcast content, the media streaming device may revert the antenna radiation pattern to the first pattern to resume streaming.

Accordingly, the process 600 may continue with determining, by the media streaming device, that the display device is to present content received from the media streaming device (606). For example, the media streaming device 102 may determine that the user provided instructions via the remote control to resume streaming content (e.g., a movie). In turn, the process 600 may continue with changing the antenna radiation pattern of the media streaming device from the second antenna radiation pattern to the first antenna radiation pattern (608). For example, the user may deactivate the second antenna and reactivate the first antenna. The process 600 ensures that the user can switch back and forth between the broadcast channels and the streaming content with minimal interruption and/or delays. In some implementations, the media streaming device 102 may be deactivated. However, activating and deactivating the media streaming device 102 may take considerably a longer time than changing the antenna radiation pattern. This, in turn, degrades the user experience. However, changing the antenna radiation patterns according to the process 600 enhances the user experience by minimizing the associated delays and interruptions while ensuring that the user can switch back and forth between the broadcast content and the streaming content without degrading the quality of either content.

Figure 7:
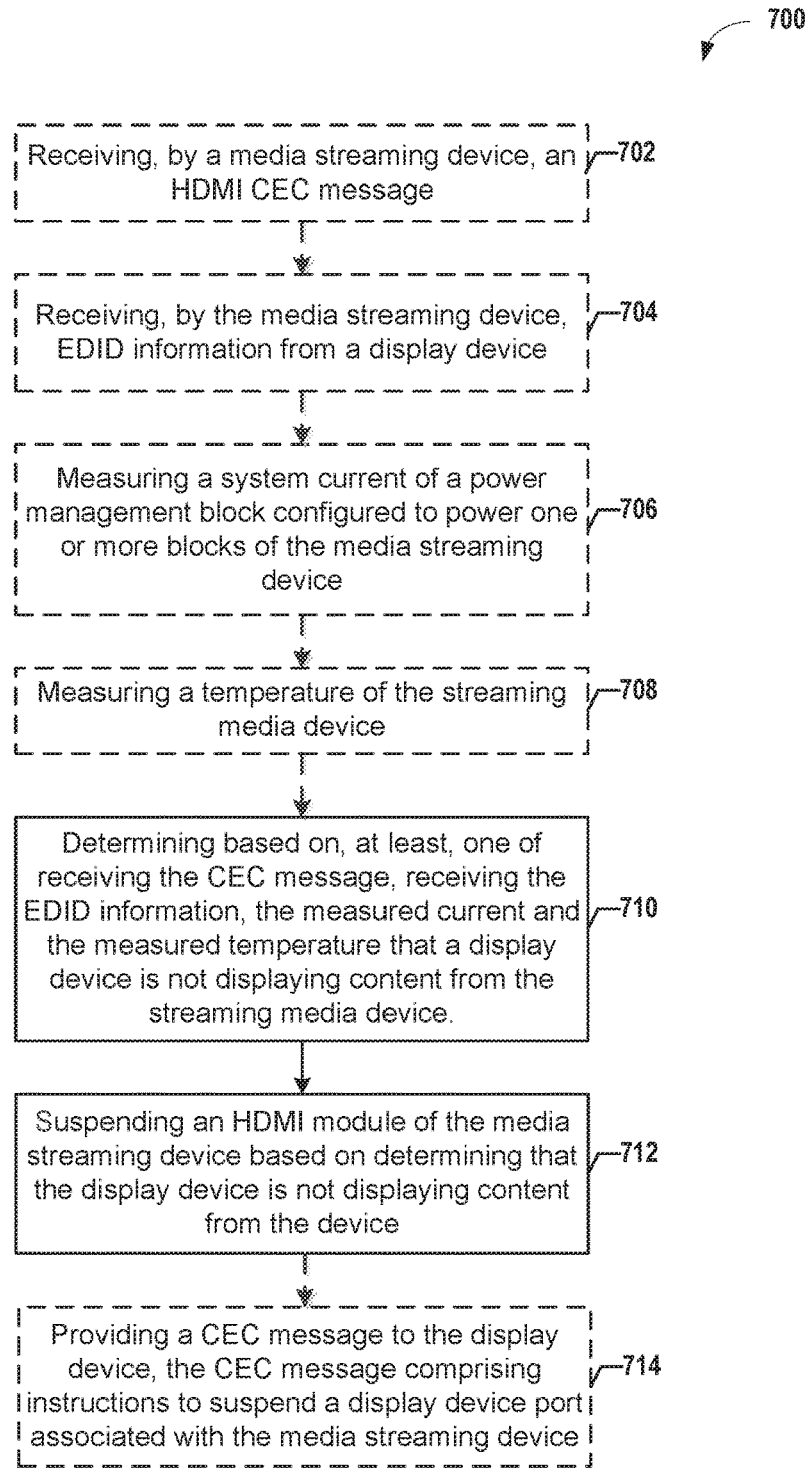

FIG. 7 is a flowchart of an example process 700 in accordance with various embodiments of the disclosure. The process 700 may begin with optional step 702 depicted in phantom. The process 700 may begin with receiving, by a media streaming device, an HDMI CEC message (702). For example, the media streaming device 102 may receive a CEC message instructing the media streaming device 102 to perform one or more playback operations (e.g., play, stop, pause, fast forward, rewind, search and/or the like).

In one example, the process 700 may continue with optional step 704 depicted in phantom. The process 700 may continue with receiving, by the media streaming device, EDID information from a display device (704). For example, the media streaming device 102 may receive EDID data from a television identifying the television and one or more functions associated with the television.

In on example, the process 700 may continue with optional step 706 shown in phantom. The process 700 may continue with measuring a system current of a power management module configured to power one or more blocks of the media streaming device (706). For example, the process 700 may measure a current associated with the PMIC 242 of the media streaming device 102. In one example, the process 700 may measure the current associated with specific components powered by the PMIC 242. In some examples, the PMIC 242 may determine the current provided to the system collectively or the current provided to each component or module separately.

In one example, the process 700 may continue with optional step 708 depicted in phantom. The process 700 may continue with measuring a temperature of the media streaming device (708). For example, the process 700 may measure a temperature of the media streaming device 102 collectively. For example, the heat produced by multiple modules or components of the media streaming device 102 may be measured collectively. In some implementations, the media streaming device 102 may measure the temperature of one or more modules or components of the media streaming device 102 independently. Such operations may be performed by the heat management module 248.

It should be understood that the above optional steps may be performed simultaneously as part of the process 700. In some implementations, all of the steps 702-708 are performed by the process 700. In some implementations, different combinations of the steps 702-708 may be performed by the process 700. Yet in some implementations still, a single step of the steps 702-708 may be performed by the process 700.

The process 700 may continue with determining based on, at least, one of receiving the CEC message, receiving the EDID information, the measured current and the measured temperature that a display device is not displaying content from the media streaming device (710). For example, based on receiving a CEC message, the media streaming device 102 may determine that the media streaming device is not actively providing content to the television. The CEC message may include, for example, instructions for the media streaming device 102 to stop streaming content. In some implementations, when content is actively being provided to the television, the television continuously or periodically sends EDID information to the media streaming device 102. Responsive to determining that the television is not providing the EDID data, the process 700 may determine that the media streaming device 102 is not actively providing content to the television.

The process 700 may compare the measured system current to a configurable threshold or threshold range. For example, if the process 700 determines that the measured current falls within a first threshold range, the process 700 may conclude that the media streaming device is actively providing content to the television. However, if the process 700 determines that the measured current falls within a second threshold range, the process 700 may conclude that the media streaming device is not actively providing content to the television. In some implementations, the process 700 may measure the current of a particular module (e.g., HDMI module) to determine whether that particular module is currently active. For example, if the particular module current exceeds a configurable threshold, the process 700 may determine that the media streaming device 102 is actively providing content to the television. Similarly, if the process 700 determines that the measured current fails to meet the configurable threshold, the process 700 may determine that the media streaming device 102 is not actively providing content to the television.

Similarly, the process 700 may compare the measured temperature to a configurable threshold or threshold range. For example, if the process 700 determines that the measured temperature falls within a first threshold range, the process 700 may conclude that the media streaming device is actively providing content to the television. However, if the process 700 determines that the measured temperature falls within a second threshold range, the process 700 may conclude that the media streaming device is not actively providing content to the television. In some implementations, the process 700 may measure the temperature of a particular module (e.g., HDMI module) to determine whether that particular module is currently active. For example, if the particular module temperature exceeds a configurable threshold, the process 700 may determine that the media streaming device 102 is actively providing content to the television. Similarly, if the process 700 determines that the measured temperature fails to meet the configurable threshold, the process 700 may determine that the media streaming device 102 is not actively providing content to the television.

In response to the determination of step 710, the process 700 may continue with suspending an HDMI module of the media streaming device based on determining that the display device is not displaying content from the media streaming device (712). For example, the process 700 may operate the HDMI module 244 in a suspended or inactive mode and/or the like. In some implementations, the PMIC 242 provides full power to the HDMI module 244 when the HDMI is not suspended or is in an active mode. In some implementations, the PMIC 242 provides less power or current to the HDMI module 244 when the module is suspended or is in an inactive mode.

In some implementations, the process 700 may end with optional step 714 shown in phantom. In such implementations, the process 700 ends with providing a CEC message to the display device, the CEC message comprising instructions to suspend a display device port associated with the media streaming device (714). For example, the process 700 may provide the television with a CEC message including instructions to turn off or suspend (e.g., operate at lower power and/or current) a port of the television that the media streaming device 102 is connected to.

Figure 8:
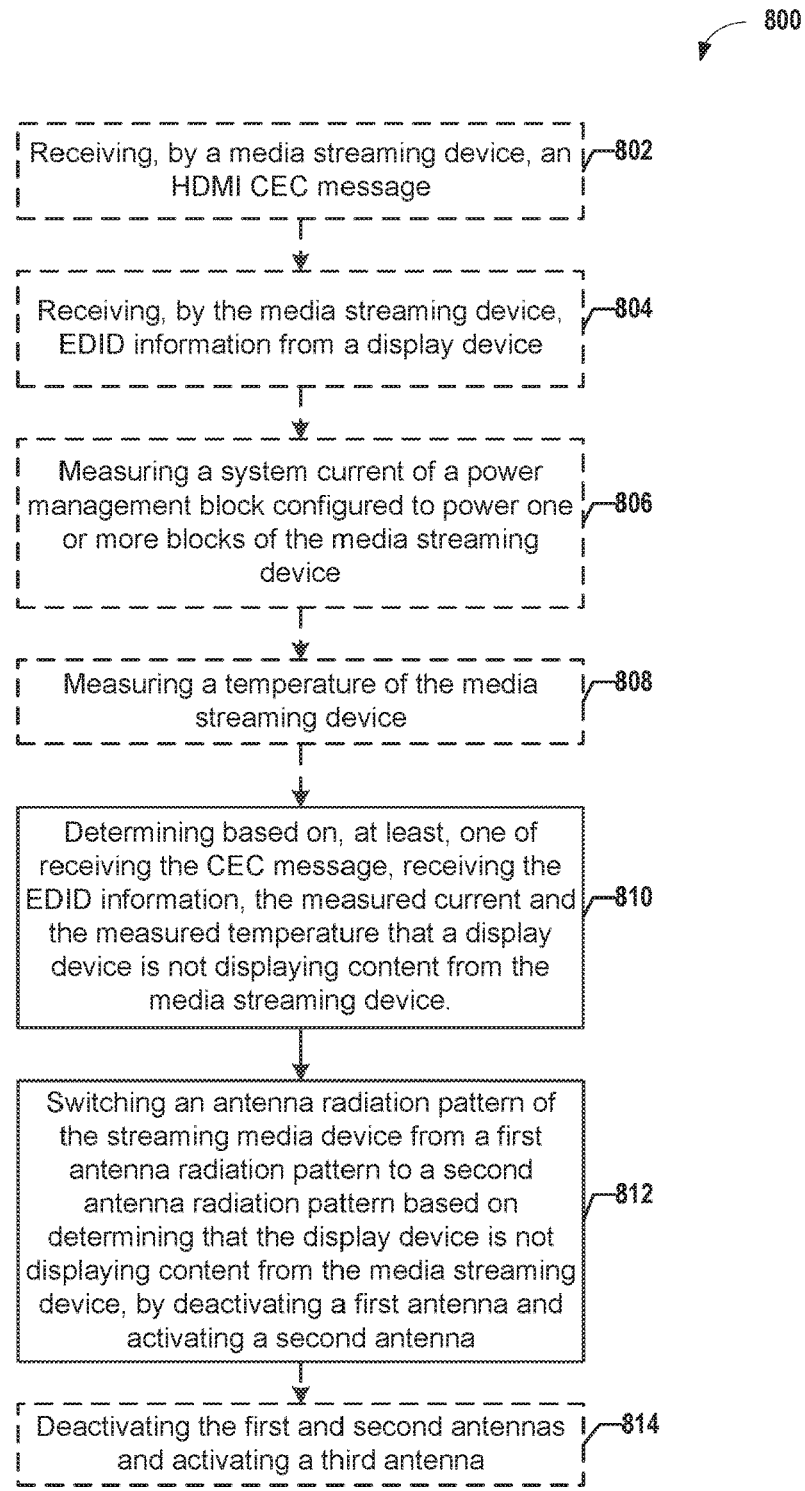

FIG. 8 is a flowchart of an example process 800 in accordance with various embodiments of the disclosure. The process 800 may begin with optional step 802 depicted in phantom. The process 800 may begin with receiving, by a media streaming device, an HDMI CEC message (802). For example, the media streaming device 102 may receive a CEC message instructing the media streaming device 102 to perform one or more playback operations (e.g., play, stop, pause, fast forward, rewind, search and/or the like).

In one example, the process 800 may continue with optional step 804 depicted in phantom. The process 800 may continue with receiving, by the media streaming device, EDID information from a display device (804). For example, the media streaming device 102 may receive EDID data from a television identifying the television and one or more functions associated with the television.

In one example, the process 800 may continue with optional step 806 shown in phantom. The process 800 may continue with measuring a system current of a power management module configured to power one or more blocks of the media streaming device (806). For example, the process 800 may measure a current associated with the PMIC 242 of the media streaming device 102. In one example, the process 800 may measure the current associated with specific components powered by the PMIC 242. In some examples, the PMIC 242 may determine the current provided to the system collectively or the current provided to each component or module separately.

In one example, the process 800 may continue with optional step 808 depicted in phantom. The process 800 may continue with measuring a temperature of the media streaming device (808). For example, the process 800 may measure a temperature of the media streaming device 102 collectively. For example, the heat produced by multiple modules or components of the media streaming device 102 may be measured collectively. In some implementations, the media streaming device 102 may measure the temperature of one or more modules or components of the media streaming device 102 independently. Such operations may be performed by the heat management module 248.

It should be understood that the above optional steps may be performed simultaneously as part of the process 800. In some implementations, all of the steps 802-808 are performed by the process 800. In some implementations, different combinations of the steps 802-808 may be performed by the process 800. Yet in some implementations still, a single step of the steps 802-808 may be performed by the process 800.

The process 800 may continue with determining based on, at least, one of receiving the CEC message, receiving the EDID information, the measured current and the measured temperature that a display device is not displaying content from the media streaming device (810). For example, based on receiving a CEC message, the media streaming device 102 may determine that the media streaming device is not actively providing content to the television. The CEC message may include, for example, instructions for the media streaming device 102 to stop streaming content. In some implementations, when content is actively being provided to the television, the television continuously or periodically sends EDID information to the media streaming device 102. Responsive to determining that the television is not providing the EDID data, the process 800 may determine that the media streaming device 102 is not actively providing content to the television.

The process 800 may compare the measured system current to a configurable threshold or threshold range. For example, if the process 800 determines that the measured current falls within a first threshold range, the process 800 may conclude that the media streaming device is actively providing content to the television. However, if the process 800 determines that the measured current falls within a second threshold range, the process 800 may conclude that the media streaming device is not actively providing content to the television. In some implementations, the process 800 may measure the current of a particular module (e.g., encoder module) to determine whether that particular module is currently active. For example, if the particular module current exceeds a configurable threshold, the process 800 may determine that the media streaming device 102 is actively providing content to the television. Similarly, if the process 800 determines that the measured current fails to meet the configurable threshold, the process 800 may determine that the media streaming device 102 is not actively providing content to the television.

Similarly, the process 800 may compare the measured temperature to a configurable threshold or threshold range. For example, if the process 800 determines that the measured temperature falls within a first threshold range, the process 800 may conclude that the media streaming device is actively providing content to the television. However, if the process 800 determines that the measured temperature falls within a second threshold range, the process 800 may conclude that the media streaming device is not actively providing content to the television. In some implementations, the process 800 may measure the temperature of a particular module (e.g., HDMI module) to determine whether that particular module is currently active. For example, if the particular module temperature exceeds a configurable threshold, the process 800 may determine that the media streaming device 102 is actively providing content to the television. Similarly, if the process 800 determines that the measured temperature fails to meet the configurable threshold, the process 800 may determine that the media streaming device 102 is not actively providing content to the television.

The process 800 may continue with changing an antenna radiation pattern of the media streaming device from a first antenna radiation pattern to a second antenna radiation pattern based on determining that the television is not displaying content from the device, by deactivating a first antenna and activating a second antenna (812). For example, as described above, the first antenna may have a first radiation pattern and the second antenna may have a second radiation pattern. Accordingly, deactivating the first antenna and activating the second antenna may switch the antenna radiation pattern of the media streaming device 102. Other beamforming techniques as described above may also be used.

In some implementations, the process 800 may end with optional step 814, shown in phantom. The process 800 may end with deactivating the first and second antennas and activating a third antenna (814). For example, the television may include one or more ports located on the back of the television 405 and one or more ports located on the side of the television (not shown). Media streaming device 102 may determine that the media streaming device 102 is connected to a first port from the ports 405, located on the back of the television, and when content is not actively being streamed, deactivate the first antenna and activate the second antenna to cause the radiation pattern to be directed away from the back of the television. However, the media streaming device 102 may determine that the media streaming device 102 is connected to a second port, located on the side of the television, when content is not actively being streamed, the media streaming device 102 may deactivate the first antenna and/or the second antenna and activate the third antenna to cause the radiation pattern to be directed away from the side of the television. Other beamforming techniques as described above may also be used.

In some implementations, the media streaming device 102 may receive EDID information identifying the make and model of a television from the television. The media streaming device 102 may also receive data indicative of which port of the television the media streaming device 102 is connected to. In turn, the media streaming device 102 may access a lookup table, a database and/or the like specifying a location of each port of the television (e.g., side panel, back panel 405 and/or the like). Accordingly, the media streaming device 102 may determine which radiation pattern would reduce the interference and activate respective antennas associated with said radiation pattern.

In some implementations, the operations of suspending the HDMI module 244 (e.g., process 700) and/or changing the antenna radiation pattern (e.g., process 800) may be reverted in response to determining that the media streaming device 102 is providing or is to provide content to the example television or the display device 106.

It should be understood that the processes, operations and functionality described above may be implemented in a plurality of systems. For example, the processes, operations and functionality above may be implemented in an external stand along a media streaming stick. Similarly, the processes operations and functionality above may be implemented in a display device such as a television, monitor, laptop, table, mobile phone, gaming console and/or the like.

It should be noted that the methods above may be modified in various ways in accordance with certain embodiments of the disclosure. For example, one or more operations of the methods above may be eliminated or executed out of order in other embodiments of the disclosure. Additionally, other operations may be added to the methods above in accordance with other embodiments of the disclosure.

Additional Implementation Details

Although an example processing system and/or device has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on a computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to a suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data including, by way of example, a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
   determining, by a media streaming stick device connected to a television, that the television is not displaying content provided by the media streaming stick device based, at least in part, on one or more of:
   a first system current of the media streaming stick device being lower than a threshold current; or
   a first temperature of the media streaming stick device being lower than a threshold temperature;
   changing, by the media streaming stick device, a radiation pattern of one or more wireless local area network (WLAN) antennas of the media streaming stick device from a first pattern to a second pattern directed substantially away from a location of an Advanced Television Systems Committee (ATSC) tuner of the television;
   transitioning a High Definition Multimedia Interface (HDMI) module of the media streaming stick device from an active mode to a suspend mode, wherein the suspend mode operates at a first power lower than a second power of the active mode to reduce interference with operation of the ATSC tuner;
   determining, by the media streaming stick device, that the media streaming stick device is to send content to the television, based at least in part a second control signal received from the television, the second control signal being one of a CEC signal or an EDID signal;
   changing, by the media streaming stick device, the radiation pattern of the one or more WLAN antennas from the second pattern to the first pattern; and
   transitioning the HDMI module of the media streaming stick device from the suspend mode to the active mode.

2. A method comprising:
   determining, by a media streaming device coupled to a display device, that the display device is not presenting content provided by the media streaming device, wherein the media streaming device comprises a port that connects to the display device using a High Definition Multimedia Interface (HDMI) interface;
   suspending operation of an HDMI module of the media streaming device; and
   changing a radiation pattern of the media streaming device from a first antenna radiation pattern to a second antenna radiation pattern directed away from a tuner of the display device.

3. The method of claim 2, further comprising:
  determining, by the media streaming device, that the display device is ready to present content provided by the media streaming device; and
  resuming operation of the HDMI module of the media streaming device.

4. The method of claim 2, further comprising changing the antenna radiation pattern of the media streaming device from the second antenna radiation pattern to the first antenna radiation pattern.

5. The method of claim 2, wherein changing the radiation pattern of the media streaming device from the first antenna radiation pattern to the second antenna radiation pattern comprises switching from a first antenna to a second antenna.

6. The method of claim 2, further comprising:
  receiving from the display device a control message identifying, at least in part, the display device;
  determining that the media streaming device is connected to a second port of the display device based, at least in part, on the control message.

7. The method of claim 2, wherein the second antenna radiation pattern is directed substantially perpendicular to a back surface of the display device and away from the tuner of the display device.

8. The method of claim 2, wherein determining that the display device is not presenting the content further comprises:
  receiving, from the display device, a Consumer Electronics Control (CEC) message or an Extended Display Identification Data (EDID) information during a predetermined period of time; and
  determining that the display device is not presenting the content based at least in part on the CEC message or the EDID information.

9. The method of claim 5, wherein switching from a first antenna to a second antenna comprises, disconnecting, by a switching mechanism, the first antenna from a transceiver of the media device and connecting, by the switching mechanism, the second antenna to the transceiver.

10. A media streaming device comprising:
  two or more antennas that send and receive data wirelessly;
  a port that connects to a display device using a High Definition Multimedia Interface (HDMI) interface;
  a data processing apparatus; and
  a computer memory apparatus in communication with the data processing apparatus and storing instructions executable by the data processing apparatus that upon such execution cause the data processing apparatus to perform operations comprising:
    determining that the display device is not presenting content provided by the media streaming device;
    suspending operation of an HDMI module of the media streaming device; and
    changing a radiation pattern of the media streaming device from a first antenna radiation pattern to a second antenna radiation pattern directed away from the tuner of the display device.

11. The media streaming device of claim 10, wherein the operations further comprise:
  determining that the display device is ready to present content provided by the media streaming device; and
  resuming operation of the HDMI module of the media streaming device.

12. The media streaming device of claim 10 further comprising:
  a switching system coupled to a data processing apparatus and the antennas, wherein the data processing apparatus is configured to operate the switching system to selectively activate and deactivate the two or more antennas.

13. The media streaming device of claim 12, wherein switching the radiation pattern of the media streaming device from the first antenna radiation pattern to the second antenna radiation pattern comprises deactivating a first antenna from the two or more antennas and activating a second antenna from the two or more antennas.

14. The media streaming device of claim 12, wherein the second antenna radiation pattern is directed substantially perpendicular to a back surface of the display device and away from the tuner of the display device.

15. The media streaming device of claim 10, wherein the operations further comprise:
  determining that the display device is ready to present content provided by the media streaming device; and
  switching the antenna radiation pattern of the media streaming device from the second antenna radiation pattern to the first antenna radiation pattern.

16. The media streaming device of claim 10, wherein determining that the display device is not presenting the content further comprises:
  receiving, from the display device, a Consumer Electronics Control (CEC) message or an Extended Display Identification Data (EDID) information during a predetermined period of time; and
  determining that the display device is not presenting the content based at least in part on the CEC message or the EDID information.

17. A device comprising:
  two or more antennas;
  one or more computer processors; and
  memory coupled to the one or more computer processors, wherein the memory stores instructions that, when executed by the one or more computer processors, cause the one or more computer processors to perform operations comprising:
    determining that a display device is not presenting content provided by the device;
    suspending operation of an HDMI module of the media streaming device; and
    changing a radiation pattern of the device from a first antenna radiation pattern to a second antenna radiation pattern directed away from the tuner of the display device.

18. The device of claim 17, wherein determining that the display device is not presenting content provided by the device comprises:
  receiving, from the display device, a Consumer Electronics Control (CEC) message or an Extended Display Identification Data (EDID) information during a predetermined period of time; and
  determining that the display device is not presenting the content based at least in part on the CEC message or the EDID information.

19. The device of claim 17, wherein the memory stores further instructions that, when executed by the one or more computer processors, cause the one or more computer processors to perform operations comprising:
  receiving, from the display device, a control message identifying, at least in part, the display device;

determining that the device is connected to a port of the display device based at least in part on the control message.

\* \* \* \* \*